Figure 1:
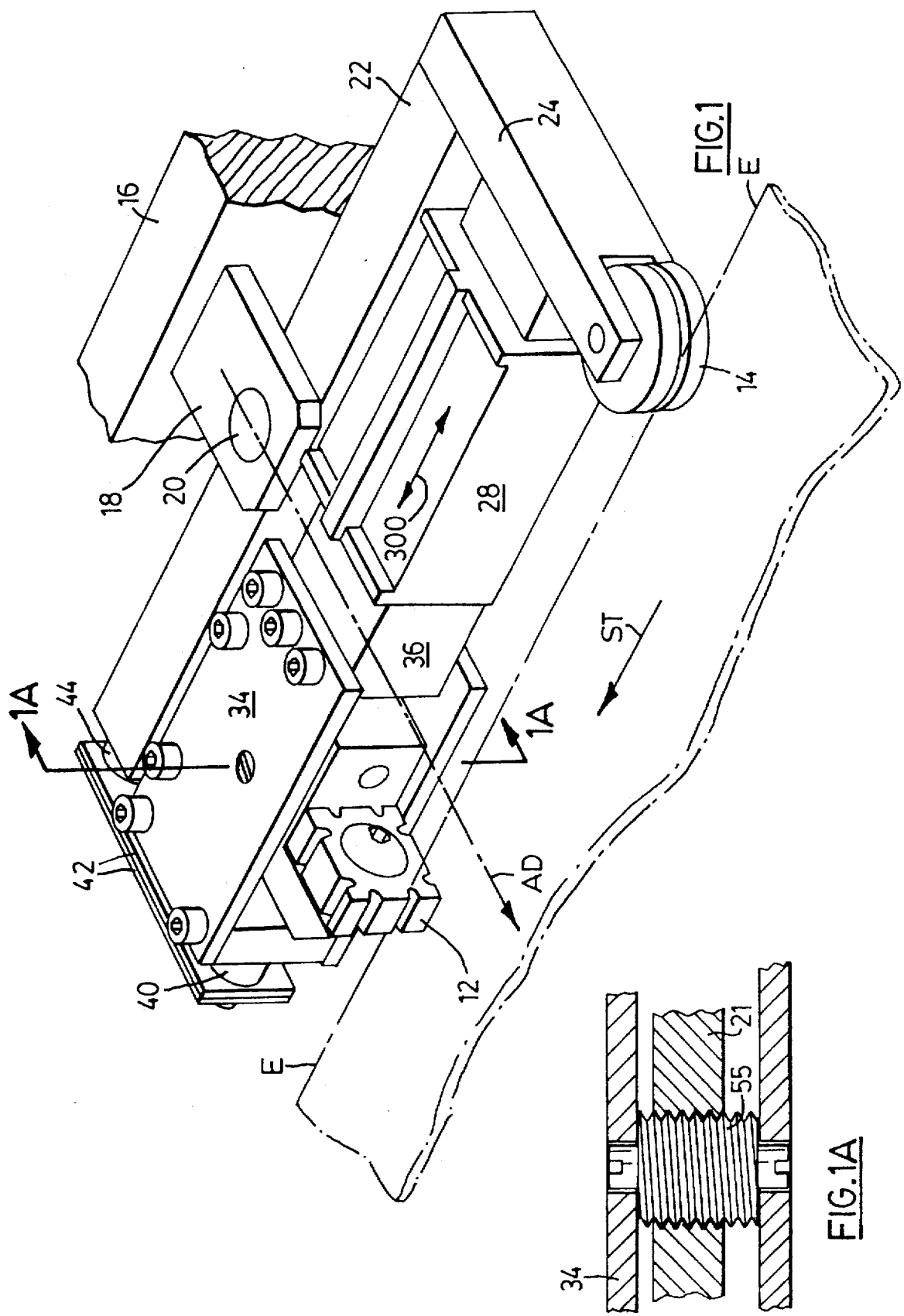

United States Patent [19]

Barnes

[11] Patent Number: 5,752,402
[45] Date of Patent: *May 19, 1998

[54] VIBRATORY OR ROCKING EDGE TREATMENT TOOL

[76] Inventor: Austen Barnes, 3407 Holborn Road, RR2, Queensville, Ontario, Canada, LOG 1RO

[*] Notice: The term of this patent shall not extend beyond the expiration date of Pat. No. 5,477,721.

[21] Appl. No.: 533,507

[22] Filed: Sep. 25, 1995

Related U.S. Application Data

[63] Continuation-in-part of Ser. No. 319,482, Oct. 7, 1994, Pat. No. 5,477,721, and a continuation-in-part of Ser. No. 964,699, Oct. 22, 1992, Pat. No. 5,410,123, and a continuation-in-part of Ser. No. 732,928, Jul. 19, 1991, abandoned, and a continuation-in-part of Ser. No. 619,498, Nov. 29, 1990, abandoned.

[51] Int. Cl.$^6$ ............................................. B21B 1/00
[52] U.S. Cl. ............................................. 72/203; 409/138
[58] Field of Search ............................................. 72/199, 203, 248; 409/204, 138, 298; 82/904; 407/77, 79, 81

[56] References Cited

U.S. PATENT DOCUMENTS

| | | | |
|---|---|---|---|
| 1,070,282 | 8/1913 | Norton et al. | 409/298 |
| 1,575,184 | 3/1926 | Smith | 409/298 |
| 2,242,815 | 5/1941 | Darner | 409/303 |
| 2,318,732 | 5/1943 | Yoder | 409/303 |
| 2,729,003 | 1/1956 | Cohn et al. | 72/245 |
| 2,932,132 | 4/1960 | Schuster | 51/59 R |
| 3,254,568 | 6/1966 | Pickard | 409/303 |
| 3,336,778 | 8/1967 | Follrath | 72/203 |
| 3,377,896 | 4/1968 | De Corta | 409/138 |
| 3,400,566 | 9/1968 | Gauer | 72/199 |
| 3,426,646 | 2/1969 | Lee et al. | 409/297 |
| 3,471,724 | 10/1969 | Balamuth | 51/59 SS |
| 3,479,852 | 11/1969 | Conrad et al. | 72/40 |
| 3,664,229 | 5/1972 | Cary | 409/138 |
| 3,690,139 | 9/1972 | Brennan | 72/199 |
| 3,691,898 | 9/1972 | Held | 409/138 |
| 3,770,178 | 11/1973 | Olah | 72/199 |
| 4,036,105 | 7/1977 | Sukhov et al. | 409/303 |
| 4,041,751 | 8/1977 | Neilsen | 72/199 |
| 4,543,022 | 9/1985 | Bonner | 409/298 |
| 4,648,762 | 3/1987 | Hall et al. | 409/138 |
| 4,961,334 | 10/1990 | Barnes | 72/129 |
| 5,477,721 | 12/1995 | Barnes | 72/203 |

FOREIGN PATENT DOCUMENTS

| | | | |
|---|---|---|---|
| 740632 | 8/1966 | Canada | 72/199 |
| 3805530 | 4/1989 | Germany | 409/138 |
| 0106712 | 8/1980 | Japan | 409/303 |
| 2185926 | 8/1987 | United Kingdom | 72/203 |

*Primary Examiner*—Lowell A. Larson
*Assistant Examiner*—Rodney Butler
*Attorney, Agent, or Firm*—Robert Westell; Dowell & Dowell

[57] ABSTRACT

An edge treatment tool having a vibratory mount to cause vibrating motion in a direction are used to treat metal edges extending in such direction. A resilient mounting may be used for the tool. The resilient mounting allows the tool to be vibrated by vibrators which oscillate with the tool or by vibrators which change length from a fixed to a resilient mount. The resilient mount is preferably provided by thin metal strips bendable about axes perpendicular both to the edge direction and to the application direction for the tool.

10 Claims, 10 Drawing Sheets

VIBRATORY OR ROCKING EDGE TREATMENT TOOL

This application is a Continuation-in-Part of application Ser. No. 08/319,482 filed Oct. 7, 1994, now U.S. Pat. No. 5,477,721 a Continuation-in-Part of application Ser. No. 07/964,699 filed Oct. 22, 1992 now U.S. Pat. No. 5,410,123, a Continuation-in-Part of application Ser. No. 07/732,928 filed Jul. 19, 1991, now abandoned, a Continuation-in-Part of application Ser. No. 07/619,498 filed Nov. 29, 1990, now abandoned.

This application relates to edge treatment tools designed for skiving, cutting, and burnishing of metal edges.

In one aspect of the invention, the apparatus provides a vibrating cutting tool which vibrates with a major component in the "cutting direction" of a metal edge to be treated by the tool.

The "cutting direction" with a longitudinally travelling metal strip is in the opposite to the direction of longitudinal travel. With a metal edge, the direction of cut will be in the longitudinal extension direction of the edge. The vibratory tool movement is frequently superimposed on the longitudinal relative travel movement of the edge relative to the tool holder but it is noted that the work of the tool is done when moving opposite to the relative strip movement. However, the vibratory motion may be used when it is the only relative movement involved.

The use of such vibratory tool movement broadens the field of activity for edge treatment tools. In the past, edge treatment tools could only be used with a rapidly relatively travelling edge. This effectively confined the use of the tool to fast moving strip when cutting and did not allow its use on materials which must be slow in speed or substantially so when treated. However, said stationary or slow moving (in their longitudinal direction) edges may be effectively edge-treated by a tool vibrating in the cutting direction. Moreover, the thread up portion and trailing portion of strip material of which cannot be run past the tool at high speed, may now be treated with the device of this invention.

The advantages of vibrating (in the cutting direction) edge treatment tools are numerous. Such cutting by a vibratory tool enables highly accurate cutting. In normal skiving operations, the minimum stable cutting depth is typically 0.003". With high frequency (up to 15000 cycles per second) cutting depths of as low as 0.001 inch are attained. With conventional arrangements, too low a relative speed, too shallow a depth of cut, or too blunt a tool edge creates disadvantageous results. One of the most serious is tool chatter. Such chatter is vibration of the tool transverse to the material travel direction and to the edge line of the tool at the contact point. Such chatter causes uneven and incorrect work. It is avoided by the vibratory tools in accord with this invention.

Thus with the vibratory tool, it is now possible to directly treat edges of material which is processed in lines which are limited in speed, such as punchpress fed material, four-slide springmaking machines, slow speed roll-forming lines, etc. Incorporation of deburring, edge shaving, and profiling (with vibratory tools in accord with the invention) into such low speed lines saves prior finishing or separate: high cost, high speed material treatment lines.

The main type of treatment dealt with here is skiving, otherwise known as scarfing, which is a cutting action. Excess material is removed to leave the shape required. The process can range from simple deburring to profiling to any required shape. The cutting is usually accomplished by carbide tool inserts, but other tools can be used.

A second type of treatment in burnishing. This is a gentler action process, usually used for deburring. The tooling for this is set with no rake, or a slight positive rake, or a curved tool can be used. In either case, a rubbing action results.

Negatively raked tools are used for skiving, zero or slightly positively raked or rounded tools for burnishing.

The technology described here can be used for either process.

A number of alternative vibrators can be used to produce the vibratory tool motion in accord with the invention.

A magnetostrictive vibrator may be used. Such a magnetostricture vibrator changes length in operation, and is customarily inserted between a fixed mount and a mount on the toolholder, which latter mount is constrained to vibrate principally in the cutting direction. Such a magnetostrictive vibrator would have a typical frequency of 15 KHz but many range from near D.C to at least 20 KHz, with a cutting depth of 0.001" minimum to 0.012" or more maximum.

A pneumatic vibrator may be used. Typically, a vibrating piston may be used producing vibrations with the major components along the piston axis. Typically, the vibrator is mounted on the tool holder to vibrate therewith. Constraints are placed on the vibration of the vibrator and tool holder to ensure that the vibration is predominantly in the cutting direction. The frequency of a pneumatic vibrator is typically 16 Hz.

Electromagnetic vibrators are also conveniently available, the most common of which produces substantial linear vibration of the vibration axis in the cutting direction. The stroke is typically up to 0.040" and typical frequencies are 60 Hz or 120 Hz but higher frequencies can be used using variable frequency generators.

Since the magnetostrictive and preferred electromagnetic vibrators change their effective length dimension in use, these are referred to collectively as length changing "devices" or "vibrators".

With the pneumatic vibrator, the preferred mounting method preferably utilizes a mounting means for the tool support and vibrator comprising a spaced pair of flat resilient members (herein sometimes called shims)which extend in spaced, roughly parallel relatively and resiliently flex to periodically permit displacements of the tool support and vibrator, in a direction which is substantially the cutting direction. Thus, although there is during vibration a very slight arcuate displacement from the cutting direction toward the workpiece of the cutting tool, at the mid point of the vibratory stroke, this slight deviation is found inconsequential and the vibratory stroke is more efficient (i.e. less energy is lost) than more conventional modes of guiding the toolholder-vibrator such as slides and guideways. Where desired, each of the two spaced shims may be replaced by multiple shims, which are longitudinally slidable with respect to each other and hence are free to flex while providing in creased strength in other than the flexure direction.

The length changing vibrators change length in the course of their vibration. Hence, the preferred suspension for the toolholder vibrator in this connection, is to mount the vibrator to align the toolholder and changeable length dimension of the vibrator in the cutting direction and to suspend the toolholder on a resiliently flexible metal strip or shim, oriented to resiliently comply in the cutting direction with vibrating motion of the free end of the vibrator link. Again, deviation due to the geometry of the shim, from the cutting direction is found to be inconsequential and the use of this flexible shim suspension is more energy efficient than slides or guideways.

A different aspect of the invention deals with the reduction of chatter. There is preferably provided a tilting mount wherein a lever whose pivotal axis is transverse to the cutting direction and transverse to the intended line of pressure, or reaction, of the edge on the tool. On the upstream end of the lever is an idler roller adapted to ride on the edge in a non-treating mode, that is without forming, cutting, or polishing it. On the downstream end of the lever is the cutting tool in contact with the edge. The result of excursions and reactions of the tool against the work piece is damped so that tool chatter cannot take place. That is, the components of reactive forces of the workpiece on the tool which are perpendicular to the cutting direction are transferred across the lever to a force of the idler roller on the edge—and back over by the reverse route, effectively damping any tendency for chatter.

In the absence of such damping, there is a risk that in operation an unstable point is reached where the chatter, involving intermittent cutting action is caused by the tool cyclically: digging in to the workpiece, releasing, engaging, digging in etc. (These phenomena are decreased but not eliminated by a sharp tool.) Such chatter provides roughened rather than treated strip edges.

Accordingly, the lever mounted tool with the idler roller upstream from the tool is effective in damping out tool chatter and the upstream idler roller is useful in maintaining strip and tool in alignment. Placing the idler roller downstream from the tool does not achieve as effective results as to either reduction of tool chatter or as to effective tool alignment.

The risk of chatter is, to a large degree, eliminated where the tool is vibrated in the cutting direction. Thus, it is possible in treatment apparatus having such vibration to proceed without the lever tool alignment and for minimizing the effects of relative displacement of the edge transverse to the cutting direction due to displacement of the workpiece edge with or without change in its width (measured transverse to the cutting direction and in the direction perpendicular to the thickness dimension of the workpiece.)

It is also useful and in accord with the invention to provide a lever mounted tool where the tool may be vibrated in the cutting direction providing a tool which may be used, free of chatter even if the vibrator is not used.

It is understood that "vibration in the cutting" direction involves, alternatively, a stroke with a major component in the cutting direction (opposite to the direction of strip travel) and a stroke with a major component in the opposite direction to the cutting direction. The tool treatment is performed in the cutting direction.

It should also be understood that the length changing vibrators may be arranged to propel the tool holder in the cutting direction during the extension or retraction stroke of the length changing vibrator.

Figure 2:
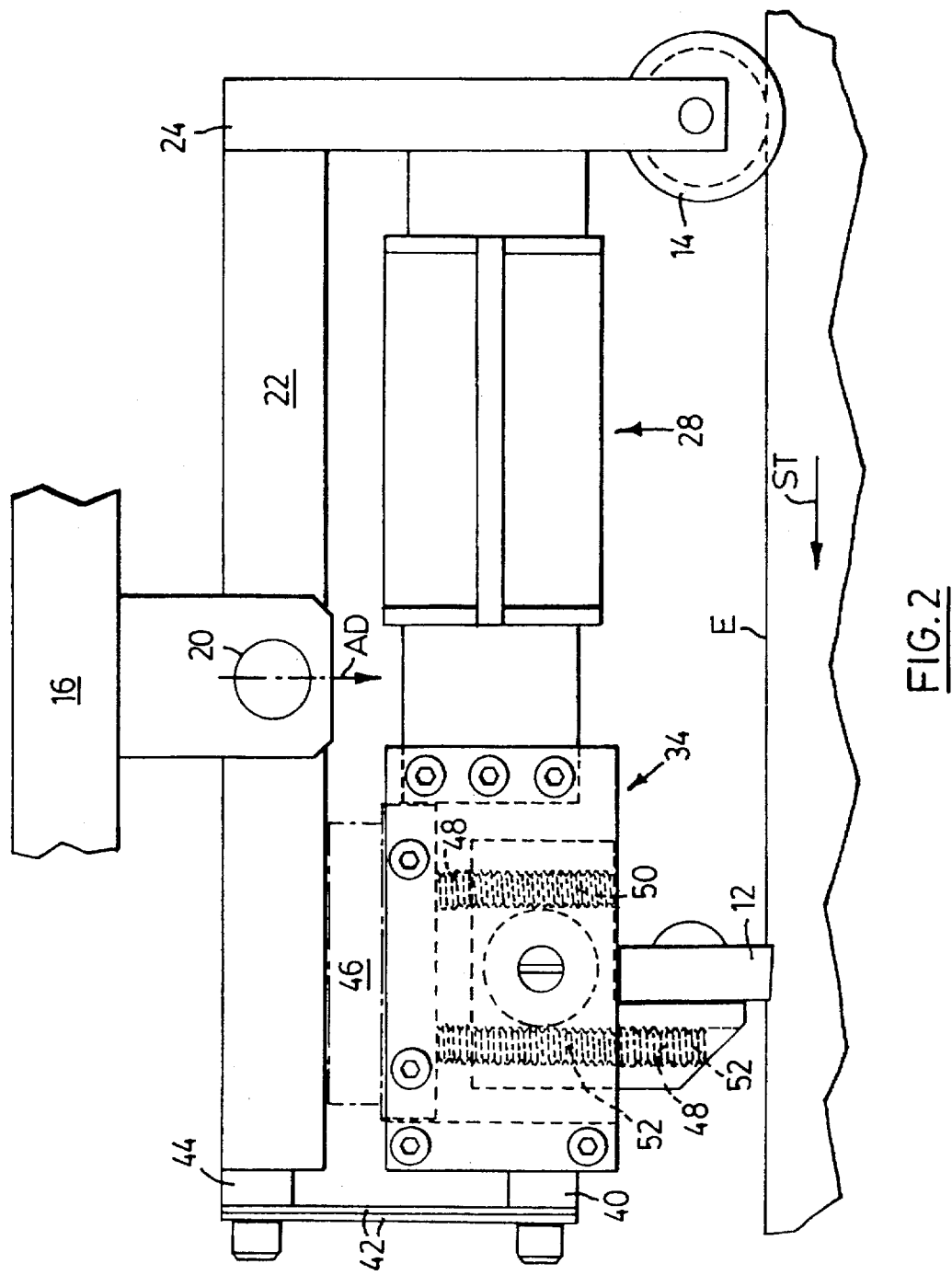
Figure 3:
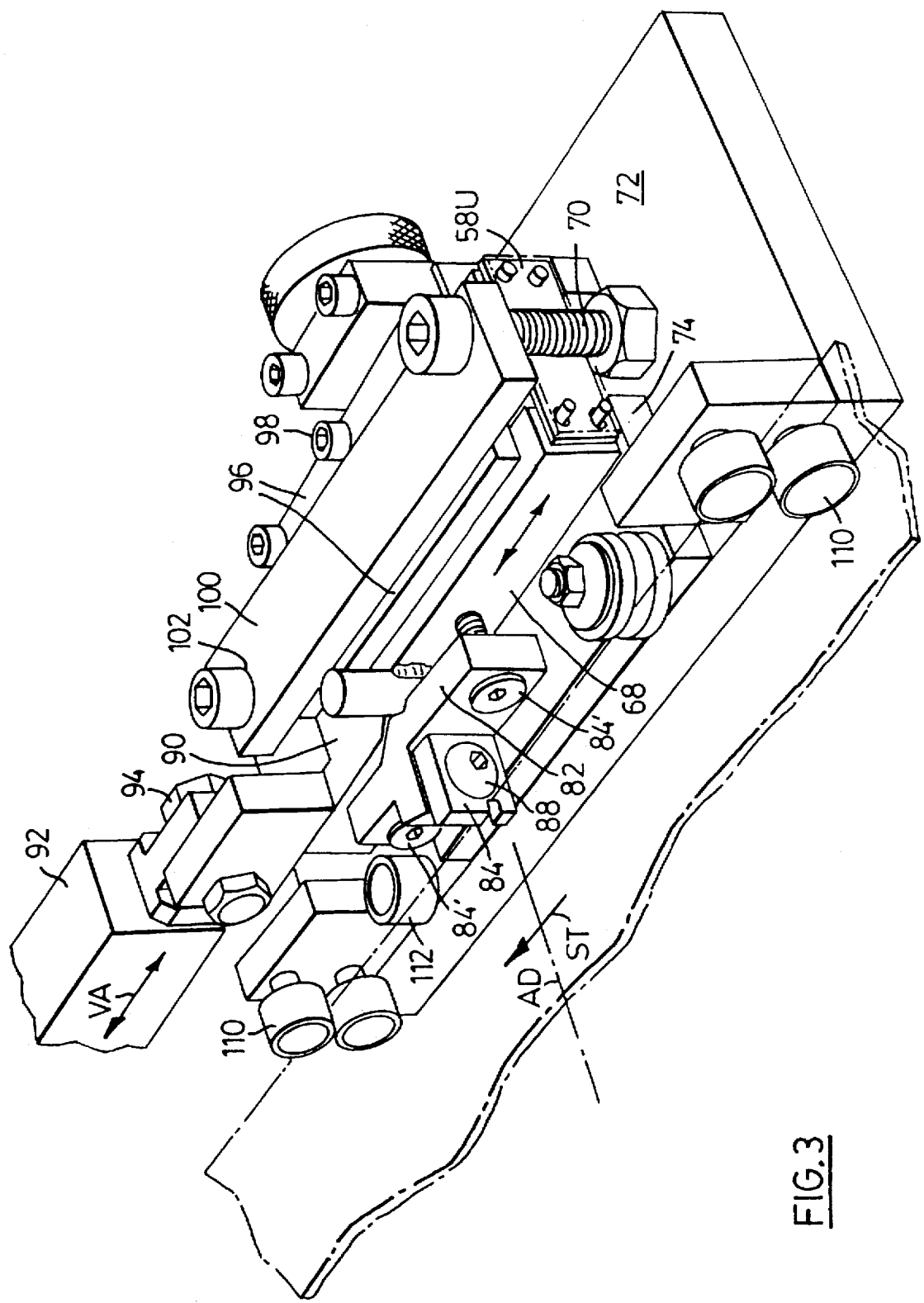

In drawings which illustrate a preferred embodiment of the invention:

FIG. 1 is a perspective view of edge treatment apparatus containing a length-changing vibrator means for vibrating a cutting tool in the cutting direction and having the tool mounted on a lever arm opposing an idler roller, FIG. 1A is a partial section taken on the line 1A—1A of FIG. 1, FIG. 2 is a plan view of the apparatus of FIG. 1, FIG. 2A is a schematic indication of tool rake, FIG. 3 is a perspective view of edge treatment apparatus wherein pneumatic means are used to cause vibration of the edge treatment.

Figure 4:
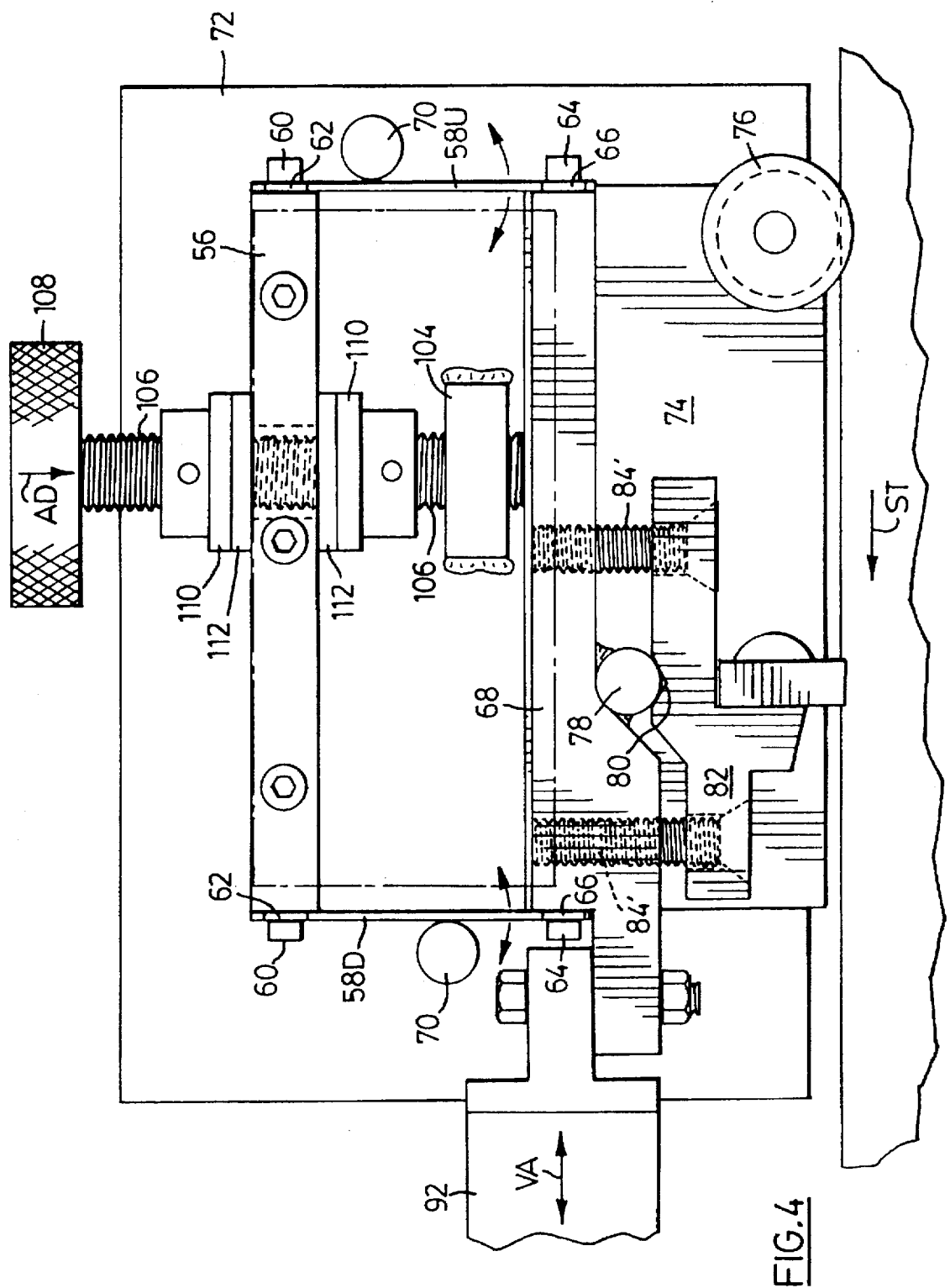
Figure 4A:
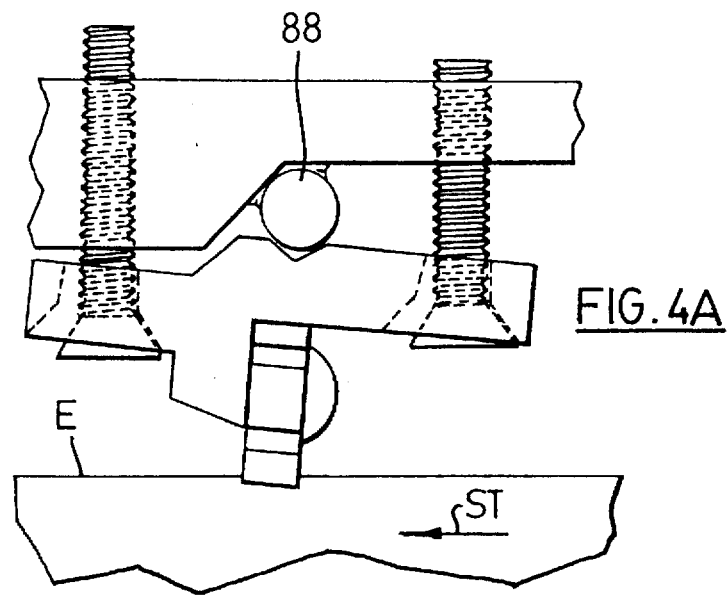
Figure 4B:
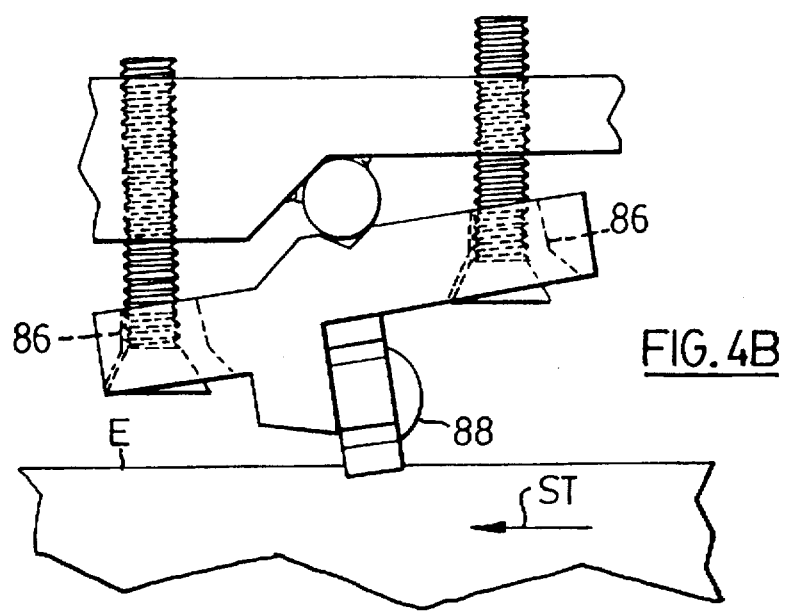
Figure 5:
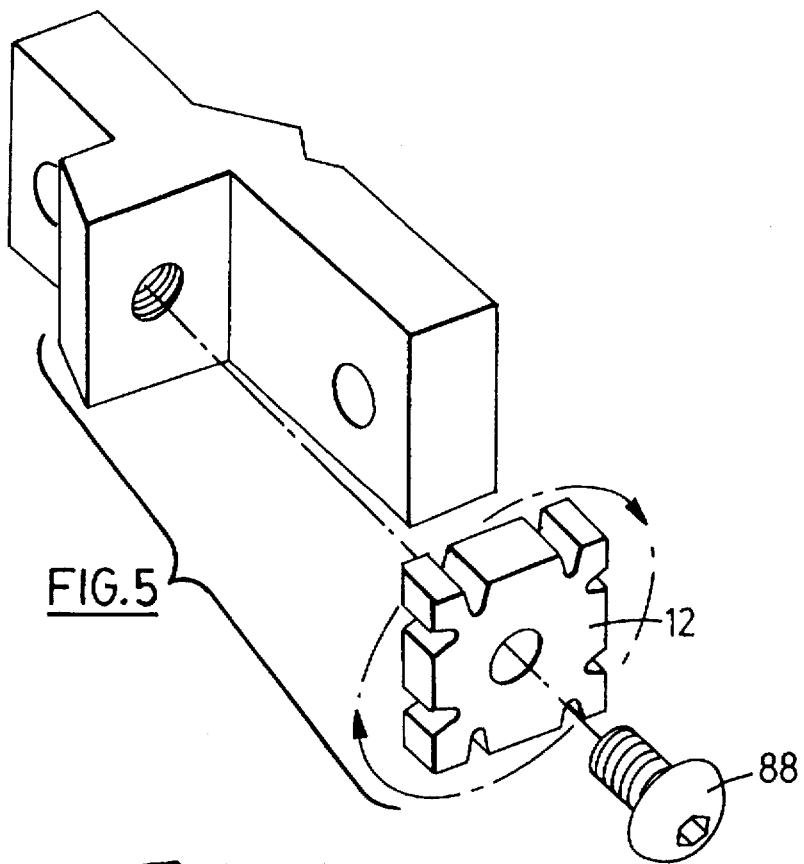
Figure 6:
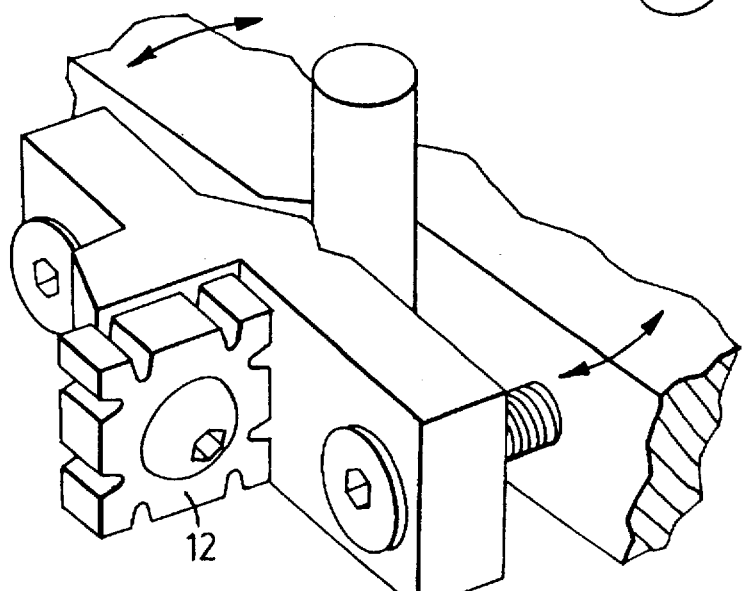

FIG. 4 is a plan view of edge treatment apparatus wherein pneumatic means are used to cause vibration of the edge treatment tool in the cutting direction;

FIGS. 4A and 4B, 5, and 6 demonstrate the operation of the toolholder shown in FIGS. 3 and 4.

Figure 7:
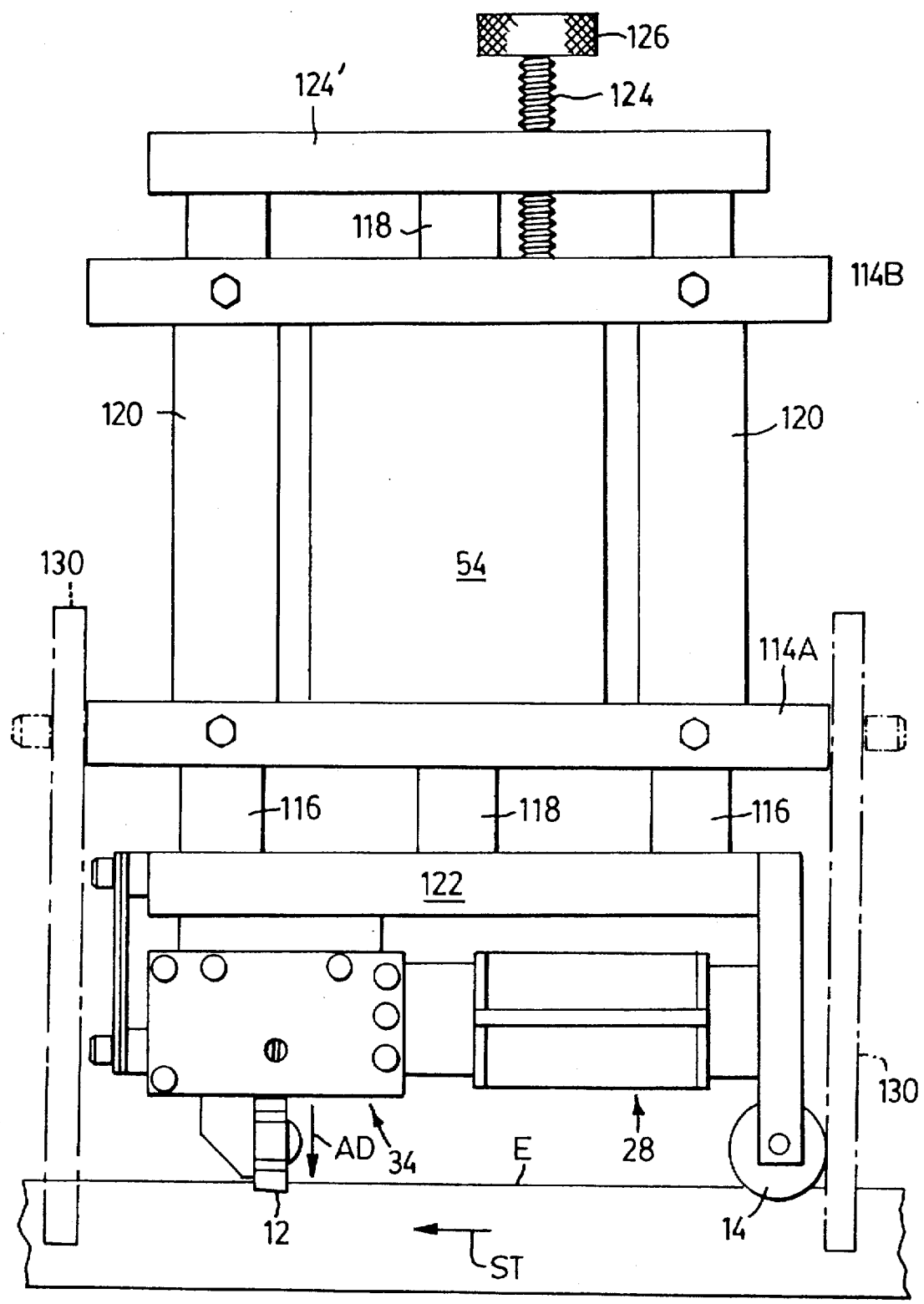
Figure 8:
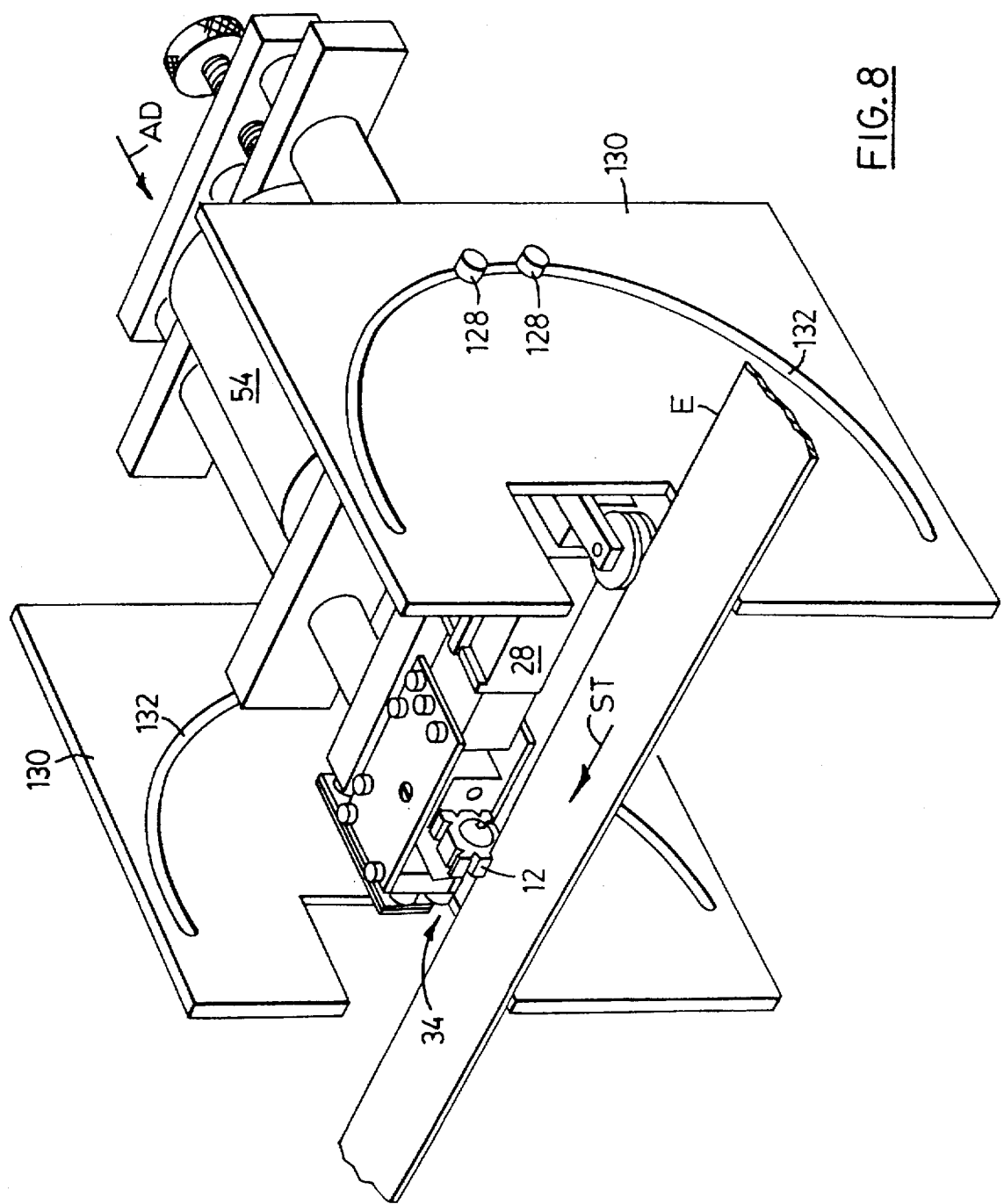
Figure 9A:
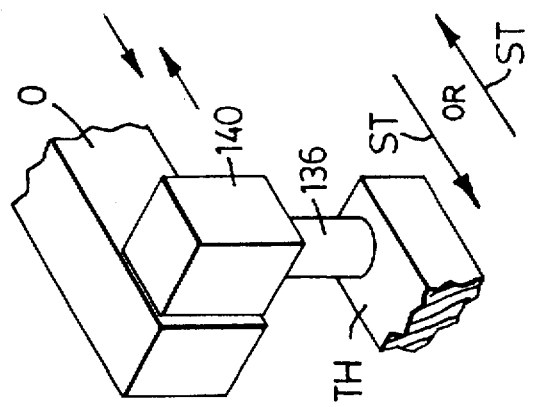
Figure 9B:
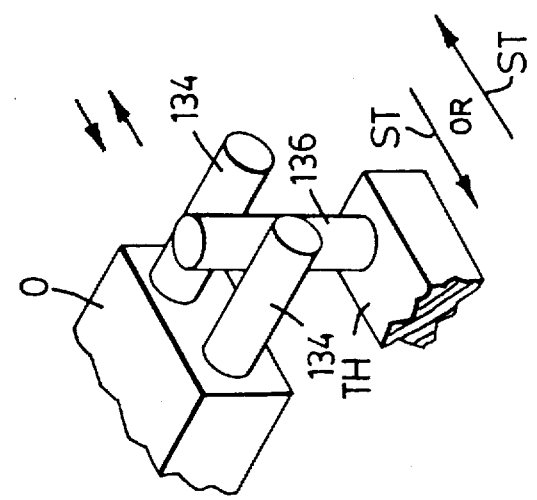
Figure 9C:
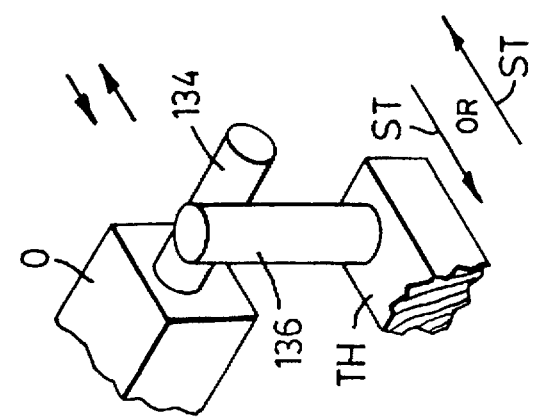
Figure 10:
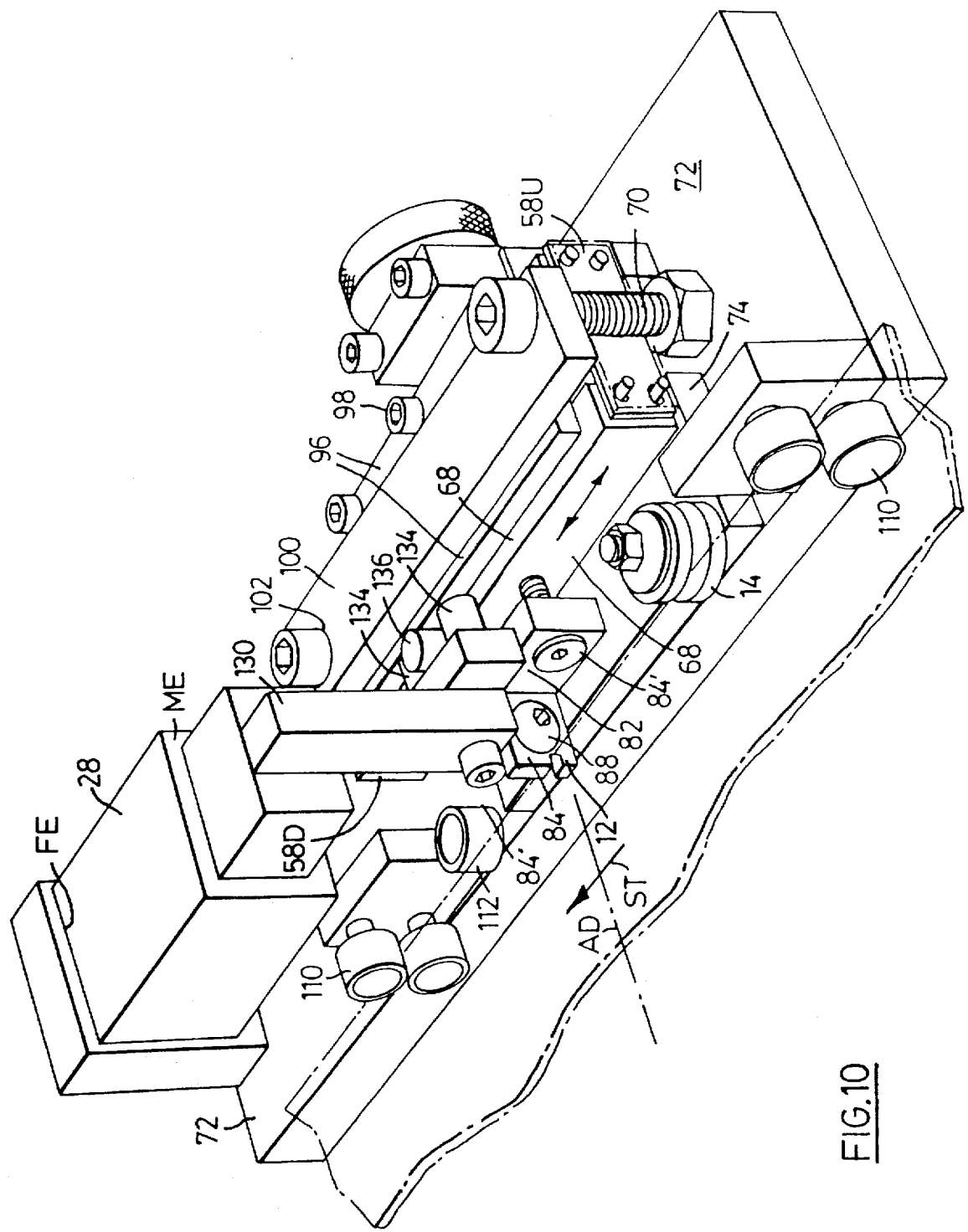

FIG. 7 demonstrates a pneumatic activation for the length changing device of FIGS. 1 and 2, FIG. 8 demonstrates the use of the device of FIG. 7 with an adjustable arcuate setting, FIGS. 9A, 9B, 9C demonstrate examples of drives between a vibratory element and a tool holder, FIG. 10 demonstrates the use of a length changing device with the drive of FIG. 9B.

In FIG. 1, strip material 10 travelling in the direction shown by the arrow ST is contacted on edge E by edge treatment tool 12 and idler roller 14.

A main carriage, not shown, is equipped to provide adjustment drive toward and away from the strip edge and will be adapted to cause constant tool pressure on the edge or constant displacement of the tool. The main carriage provides bar 16 for mounting the tool sub-carriage.

The bar 16 provides extension bracket 18 which at pivot mount 20 provides lever or tether arm 22 to pivot about an axis transverse to the strip travel direction and to the tool approach direction AD of pressure application of the tool to the edge E. (In the drawing, the direction of application would be the plane of the strip, however in other applications, the direction AD of application may be at an angle above or below this plane.) The tool 12 is shown notched, and roll 14 is shown grooved. If direction AD is angled above or below the plane, then a plain tool and non-grooved roll are used.

Tether arm 22 mounts at one end, fixed arm 24 on which is pivotally mounted idler roller 14 in contact with the edge E strip 10. Arm 24 also fixedly mounts one end of a length-changing magnetostrictive or electromagnetic vibratory device 28 of any conventional form having its vibration (i.e. length-changing) axis with a major component in direction 30 (the cutting direction) and in the opposite direction which directions will therefore be parallel to the cutting direction and to edge E (normally).

Tool mount 34 is supported at one end by the output side 36 of the length changing device. The other side of the tool mount provides boss 40 to which is bolted one or more (here two) flexible resilient flat strips 42 which are oriented to bend about axes transverse to the approach direction D and to the strip travel direction. The other ends of the strips 42 are bolted to boss 44 on the end of the tether arm 22 remote from arm 24.

A low friction pad 46 is attached to the surface of lever 22 to allow sliding of tool mount 34. It will be noted hereafter that there will be a small deviation of tool mount 34 toward lever 22 during the extension portion of the length-changing vibrator stroke. Thus, the thickness dimension of pad 46 must allow for such deviation. The length-changing strictive stroke with a magnetostrictive vibrator is so short that this deviation is very small.

In operation with tool 12 and roller 14 in contact with edge 26, and with the controls set to exert the desired amount of tool 12 pressure or tool 12 depth on strip 10 at end 26 and with the strip travelling the direction shown, the length-changing device 28 is activated. The extension motion of the length-changing device causes the two shims 42 to each make a very small S-curve and the contracting motion causes the tool to be applied in the cutting direction in accord with its setting to treat edge E of the travelling strip. The length-changing device is oriented to cause the main components of such reciprocal travel in the cutting direction, and in its opposite direction, the deviation caused by bending of the shims being negligible for both electromagnetic and magnetostrictive vibrations, during vibration.

In this way, the treatment of the strip edge may be performed depending upon the type and the rake of the tool.

Tool rake is controlled by headless bolts 48 moveable by screwdriver in bores 50 and 52 which bear on surfaces on the mount 34 and control the attitude of the tool holder 21 relative to the rigid assembly. In this way, the tool may assume negative rake 12A to perform cutting, scarfing, or skiving (see variant 12A FIG. 2A) or the tool may assume positive rake (see 12B FIG. 2A for polishing or burnishing the edge).

Also, as shown in FIG. 1A, the tool 12 is indexable on its threaded fulcrum mount 55 to alternative slots, or in the case of plain tools, offer different portions of the tool cutting edge to the material edge. Rotation of the tool mounting fulcrum shaft shifts the toolholder on its axis. Set screws 48 must be loosened prior to this adjustment.

The tool holder-vibrator assembly (omitting pivot 20) may be suitably mounted on a rotary mount as shown in FIG. 8 of application or otherwise mounted for varying the angle of the cutting pressure, for application to the strip edge. Pivot 20 may be included in the assembly mount if desired. The air pressure actuator 54 of FIG. 8 will be hereinafter described.

FIGS. 3 and 4 show an edge treatment device using a pneumatic vibrator. In FIGS. 3 and 4, a tether bar 56 is shown for mounting the tool holder assembly. The manner of mounting the tether bar on the main carriage will be discussed hereafter. At each end, one or more flat flexible strips or shims 58D and 58U are loosely suspended on pins 60 extending loosely through apertures 62. At their respective other ends, the strips 58D and 58U suspend vibrator bar 68 by pins 64 extending loosely through apertures 66 to opposed surfaces on backplate 68. Posts 70 mounted on the main carriage 72 prevent the escape of the shims from their pins 60 and 64. As will be noted hereafter, the choice of location of the posts 64 along the shim longitudinal dimension may be used to control the stiffness of the shim resilient flexure.

A plate 74 is welded to vibrator bar 68 for contacting vibration therewith and mounts idler roller 76 for contacting that edge of the strip. A fulcrum pin 78 is welded to vibrator bar 68 and is rotatably slidably received in the concavity 80 of tool holder 82. Headed screws 84 (see FIGS. 4A and 4B) extend through bores 86 wide enough to allow limited pivoting of tool holder 82 about fulcrum pin 78. The tilt is selected to provide the amount of negative rake (e.g. FIG. 4A) for cutting, skiving, or other material removal; or the amount of positive rake (e.g. FIG. 4B) for polishing, burnishing, or the like. The tilt is controlled by the rotation of screws 84 which are threadedly seated in threading in vibrator bar 68.

The bolt 88 mounts a tool 84', facing upstream. The tool is typically carbide steel but may be constructed from other materials. The tool may typically have 8 to 12 grooves to provide 16 to 24 cutting surfaces, may have single grooves or selected sides and no grooves. A tool with no grooves on a side may be indexed to use a range of settings for applying various selected edge locations to the strip edge.

Mounted on the plate 74 to contact the strip edge upstream of the tool-edge contact point is idler roller 76.

Rigidly mounted on an extension 90 of vibrator bar 68 is a pneumatic vibrator 92. The vibrator 92 is conventionally available and uses a piston vibrating in a cylinder (not shown) and has a main vibration components in opposite directions along the axis of the cylinder as indicated by the arrow VA. The vibrator 92 is mounted on the back plate, here by bolt 94, so that its main vibration component axes are parallel to the cutting direction. (It being noted that if the edge were stationary, the vibration of the back plate would define the cutting direction).

Thus, with the tool 84' in contact with the strip, vibration of the pneumatic vibrator causes vibration of the vibrator bar 68. The motion of the vibrator bar 68 is contained by the limited freedom allowed by shims 58D and 58U. Under such vibration the shims achieve limited bending about axes perpendicular to the cutting direction ST and to the approach direction AD with amounts of bending determined by the positioning (along the line between the pins 60, 64 of the posts 70. Thus, under vibration, the shims deflect slightly relative to the pins due to the loose fit thereon. The shims further bend about the bending axes in degrees controlled by the positioning of the posts 70. Although the motion thus produced in the tool holder 82 is not theoretically parallel to the cutting direction, the difference is negligible and the shim mounting means shown tends to produce in the tool holder motion parallel (for practical purposes) to the cutting direction and to reduce any tendency to vibrate in other directions due to other components of the vibration of the pneumatic vibrator.

In place of the mounting shown, there could be used shims at each end bolted to the back plate 56 and to the vibrator plate 68, although the mode first-described is found preferable.

Obviously there is a further alternative wherein the tool holder, back plate, and vibrator bar as a unit are mounted by slides or grooves to vibrate in the cutting direction on the base plate. However, this has been found inefficient and to damp the vibratory motion in relation to the flexible shim suspension described above.

As shown in FIG. 3, a hold-down plate 96 is bolted to the back plate 56 by bolts 98 to extend downwardly to slidably overlie the back plate 56 and vibrator bar 68 and maintain them in position against movement perpendicularly to the main carriage 72. The dimensions of the hold-down plate 96 are chosen so that it will not contact the shims 58U or other vibrating elements other than vibrator bar 68 or back plate 56.

As shown in FIG. 3, a hold-down metal strap 100 is bolted to main carriage 72 by nuts or bolt heads 102 of bolts 70. The strip 100 maintains the tool mounting assembly including back bar 56 in place on the main carriage 72 while allowing its vibratory movement as already described and its rocking movement to be described.

The tool mounting assembly or sub-carriage is mounted on the main carriage 72 as follows. The main carriage 72 mounts a fixed bracket 104 adapted to receive the threaded control bolt 106 which has a knurled knob 108 for manual control.

Fixed by mounting on the thread are shaft collars 110 which are attached by set screws to the bolt for rotation therewith. Resting against each collar is a spherical washer pair set 112 seating on the back plate 56, also. The back plate 56 and washer pairs 112 have a wide bore to receive bolt 106 loosely to allow rocking of the back plate 56 and the tool assembly or sub-carriage relative to the base. The spherical center for the spherically shaped washers is half way between the washers and half way across the thickness of the back bar 56 measured along the screw axis. The spherical centre is located along the tether bar to be approximately equidistant from the edge contact points of the tool and idler roller.

Mounted on the base is the strap 100 which slidably allows swinging of the tool assembly or sub-carriage relative to the main carriage 72 about the centre of the spherical washers. The base may also provide top and bottom rollers 110' and side roller 112' to control positioning of the strip.

In operation of the tool assembly, the tool rake is adjusted by adjustment of bolts 84. The strip with the edge to be treated is started. The main carriage is used by means hereafter described to bring the tool and the idler roller adjacent to the strip edge. The fine adjustment to achieve tool and roller contact with the edge is made with the knob 108 on the main carriage. The tool and roller contact the strip edge and cause tilting of the tool assembly about the spherical centre of the washers to balance the pressure of the tool and idler roller on the edge. The main carriage may again be adjusted as hereinafter described by the method in use of bringing the required amount of cutting depth or pressure. The strip may then be started in direction ST followed by the vibrator 92. With the combination of strip movement and vibration, the strip may be processed at a slower rate than without the vibration.

The vibrator may be used with very slow strip movement where edge movement is difficult. This allows treatment of start and ends of strip reels and of the edges of materials which are not adapted to rapid movement in direction ST.

The apparatus may be where the rocker construction here the rocker construction significantly reduces the propensity for tool chatter.

FIG. 7 shows air pressure loading for the tool mounting assembly of FIG. 2. Bar 122 replaces lever 22 and mounts shims 42, length changing member 28 and toolholder 34 all as described in connection with FIG. 2. Tool 12 and roller 14 contact the edge of the strip travelling in direction ST. Bar 122 may mount lever 22 carrying the above assembly, alternatively.

Bars 114A and 114B attach the unit to a main carriage or other mount. Support bar 122 is supported on the side shafts 116 which slide freely in linear ball, sleeve or roller bearings (not shown) enclosed in the housings 120 which are rigidly fastened to the bars 114. Mounted on main bars 114A and 114B is a double acting double ended air cylinder 54 actuated by an air pressure source and valving not shown. Piston rod 118 bolts to the support bar 122 and to the back bar 124. A micrometer screw 124 operated by control knob 126 adjustably sets the minimum advance of the tool mounting assembly including tool mount 34 and magnetostrictive element 28 toward the strip edge. When screw 124 is retracted piston 54 may be used to cause the tool 12 and idler roller 14 to exert a constant pressure on the strip edge E, for edge treatment.

Alternatively, screw 124 may be advanced to set a fixed approach location of tool 12 and idler roller 14 to the edge strip. In this arrangement the air piston allows resilient retraction of the tool and roller under pressures exerted by strip edge E with resilient stiffness dictated by the selected air pressure of cylinder 54.

In a vertical orientation of the unit of FIG. 7, (the orientation of the drawing) air pressure may be applied to apply pneumatic force in the direction away from strip edge E to balance the weight of the tool assembly on the strip.

If desired, a bar similar to 122 may be attached to the side shafts 116 and piston rod 118 and a bar 22 attached to shims 42 and arm 24 so that a rocker connection may be located between the "122-similar" bar and bar 22 to provide a rocker mount for the tool assembly, as in FIG. 2.

Alternatively, the bars 114B and 114A as a unit may be provided with a rocker connection to a main carriage.

In either of the last two alternative arrangements, the air pressure actuation advantages are combined with the advantages of the rocker mount with the vibration treatment of a length-changing transducer 28.

FIG. 8 shows the unit of FIG. 7 mounted by bolts 128 on slots 132 side plates 130 (on mounting means not shown). (The side plates 130 and bolts 128 are shown in dotted form in FIG. 7). Slots 132 define an arc of a circle which may be centered on the strip edge E for to allow setting the unit for any angle of treatment by tool 12 and roller 14, with consequent use of the air pressure means, and of the vibrator 28. FIGS. 9A, 9B, and 93 show three means for a length changing vibrator to couple reciprocating movement of a (pneumatic or length changing) vibrator into linear movement in the cutting direction of a tool holder TH. Where the single pin 134 drives the single pin 136 it is noted that the drive stroke of a length changing vibrator may be either the expansion or contraction stroke. The pins 134 and 136 must be arranged relative to the stroke direction and the strip travel direction so that in the absence of vibration the strip friction on the tool will bring the pin 136 into contact with the pin 134 ready for the next vibratory treatment. The drives of FIG. 9B and 9C will achieve this since they limit travel of the tool holder relative to the vibrator in either strip travel direction. In the drive of FIG. 9C the block 140 on the vibrator has a bore, not shown, making a loose fit with the pin 136 so that the pin 136 may ride in the bore to the depths required to absorb travel of the tool sub carriage perpendicular to the cutting and strip travel direction when damping chatter action. Alternatively, a snug rotative fit can be used and the connection to block 140 from the vibrator can be a resilient shim or bendable strip to provide the required compliance.

FIG. 10 shows a length changing device with the drive of FIG. 9B.

FIG. 10 shows a tool assembly of the type of FIGS. 3 and 4 except that no pneumatic vibrator is attached to vibrator bar 68 and a length changing vibrator is used as described. Vibrator bar 68 is mounted, for vibration in the cutting direction on shims 58u and 58D. Fulcrum pin 78 (not shown in FIG. 10) has been extended so that its end forms pin 136, as in FIG. 9B. In FIG. 10 main carriage 72 has been extended to the left to mount the fixed end FE of length changing element. The moveable end ME of the length changing element is provided with vertical bar 130 which, at its lower end, mounts pins 134 and extend perpendicular to pin 136 and straddle it. Accordingly, the vibratory motion coupling allows tool carriage rocking action components perpendicular to the cutting and strip travel directions. These are elements between pins 136 and 134 so that pin 34 and bar 68 decouple these perpendicular components and vibrate under the control of shims 58D and 58U. If vibration is stopped, then the strip pressure on tool 84 will carry pin 136 against the appropriate pin 134 allowing operation on the next vibration.

Advantages of vibrating tooling include:
1. The vibration, increases the relative movement between the material and tool, enabling cutting at a very low material speeds. This enables effective skiving of material being fed into cyclically fed machines such as punchpresses, slow speed tubemills, or low speed machines such as fourslide springmaking machines, and some rollformers. This material was previously impossible to treat. Skiving is not normally a satisfactory process at low speeds, as the material tends to be torn by the tool rather than be cut.
2. The vibration greatly reduces the drag load or pull load resulting from cutting. This enables use with low pull-force pressfeeders or fourslide springmaking machine feeders without additional pulling devices, such as motorised nip rolls.

A secondary benefit from the reduced tool stress is the ability to cut at higher speeds than before without lubricant, and longer tool life. This also applies to high speed lines.

3. The vibration causes cleavage planes in the scarf, avoiding the tough "clockspring" like spirals, enabling scarf to be easily broken up. This is particularly valuable in treating harder materials, such as spring steel or stainless steels.

This benefit also applies to both low speed and high speed lines.

4. Because of the low pullforce or feeding force required, machines fitted with these devices can treat the material while it is being threaded up in the machine, using the column strength of the nose portion of the strip. Previously, the process depended upon adequate high pullforce, and the nose of the strip remained untreated, and was usually discarded. Similarly the tail of the strip can also be treated at low speed, and used. These benefits accrue to both low and high speed metal processing lines.

5. Depth of cut can be more accurately controlled, useful for accurate width sizing, etc., as vibratory cutters can cut as little as 0.001 inch depth. Normal skiving tools cut consistently to only 0.003 inch minimum depth tolerance.

6. Some materials such as galvanizing, stainless steels, titanium, and aluminium tend to bond to some grades of carbide used for cutting tools. Vibratory tools discourage bonding.

7. Skiving tools tend to dig into the material when restarting after a mid-strip stop, leaving a mark or gouge. In some skiving systems, provision is made for backing up the material a few feet after a stop, enabling the material to "take a run at" the tools, avoiding dig-in. This backing up is often inconvenient or impossible, such as in tube and pipe mills, and the material at the restart point in to be located in the finished product and discarded. Vibratory tools enable restarts without dig-in, and the product is acceptable.

Note that the advantages in 2, 3, 4, 5, 6, and 7, are also beneficial in high speed metal processing lines with inherently adequate cutting speed, already suited to high quality finishing without vibratory tooling. These lines include high speed tube and pipemills, paintlines, hot dip and electrolytic galvanizing lines, high speed rollforming, and slitting lines.

I claim:

1. Edge treatment means for treatment of a metal edge extending in a longitudinal direction,
    a tool carriage mounting an edge treatment tool, on said carriage so that said tool, after movement of said tool in an approach direction will contact said edge during relative movement therebetween in said longitudinal direction,
    vibration means for introducing vibration of said tool relative to said mounting means,
    said vibration having a major component in said longitudinal direction,
    a tool mount attached to a resilient strip which extends from said mounting means and is resiliently bendable about axes perpendicular to said longitudinal direction and perpendicular to said approach direction.

2. Edge treatment means as claimed in claim 1, wherein said length changing element has a rest length and a different length in said longitudinal direction wherein a fixed length arm extends roughly parallel to said strip.

3. Edge treatment means for treatment of a metal edge extending in a longitudinal direction,
    a tool carriage mounting an edge treatment tool, on said carriage so that said tool, after movement of said tool in an approach direction will contact said edge during relative movement therebetween in said longitudinal direction,
    vibration means for introducing vibration of said tool relative to said mounting means,
    said vibration having a major component in said longitudinal direction,
    a tool mount is attached to said carriage by strips roughly parallel at rest, said strips being resiliently bendable about axes perpendicular to said longitudinal direction and said approach direction.

4. Edge treatment means for treatment of a metal edge travelling in a longitudinal direction,
    means for mounting an edge treatment tool,
    means for bringing said tool in an approach direction into contact with said edge,
    means for causing cyclic vibration of said tool in alternating directions having major components in the direction of and in the opposite direction to said edge travelling,
    having means for suspending said tool allowing cyclic resilient deflection of said tool with major components of movement in said direction and in said opposite direction,
    said tool is suspended on generally parallel resilient flat strips nearly parallel at rest bendable by said vibration means about axes generally perpendicular to said longitudinal and to said approach direction.

5. Edge treatment means for treatment of a metal edge travelling in a longitudinal direction,
    means for mounting an edge treatment tool,
    means for bringing said tool in an approach direction into contact with said edge,
    means for causing cyclic vibration of said tool in alternating directions having major components in the direction of and in the opposite direction to said edge travelling,
    having means for suspending said tool allowing cyclic resilient deflection of said tool with major components of movement in said direction and in said opposite direction,
    said tool and said vibration means as a unit are suspended between a fixed arm and a resilient flat strip bendable about axes generally perpendicular to said longitudinal and to said approach direction.

6. Edge treatment means for treatment of a metal edge extending in a longitudinal direction,
    a tool carriage mounting an edge treatment tool, on said carriage so that said tool, after movement of said tool in an approach direction will contact said edge during relative movement therebetween in said longitudinal direction,
    vibration means for introducing vibration of said tool relative to said mounting means,
    said vibration having a major component in said longitudinal direction,
    wherein said vibration has components in other than said longitudinal direction and means for reducing the transfer of vibration components other than those in said longitudinal direction.

7. Edge treatment means as claim in claim 5 wherein said means for reducing the transfer of vibration components, reduces the transfer of such components to the tool mount.

8. Edge treatment tool as claimed in claim 5 wherein said vibration means comprises a cyclical length changing element having a vibratory axis extending between a fixed end and a movable end, with said movable end connected to a tool mount on which said tool is mounted, said tool mount being resiliently mounted on said mounting means by resilient mounting means connecting said tool to said carriage.

9. Edge treatment means for treating a strip edge moving on a travel path, to define upstream and downstream locations, a carriage mounted to pivot about an axis perpendicular to said travel path, a tool mounted on said carriage to contact said edge, an idler roller mounted to contact said edge upstream from said tool.

10. Edge treatment means for strip material having an edge extending in a longitudinal direction, including a carriage, means for advancing said carriage in an approach direction relative to said strip material, means allowing limited rocking movement of the carriage relative to said edge, said rocking movement comprising movement about a rocking axis approximately perpendicular to said longitudinal and to said approach direction, a material removal tool mounted on said carriage adapted to contact one edge of the strip and an edge contacting grooved or no grooved idler roller located upstream from said tool.

* * * * *